(12) United States Patent
Polk et al.

(10) Patent No.: US 8,190,134 B2
(45) Date of Patent: *May 29, 2012

(54) TECHNIQUE FOR DISPLAYING INFORMATION ANCILLARY TO A LOCATION OF AN ENTITY IN A COMMUNICATION NETWORK

(75) Inventors: James M. Polk, Colleyville, TX (US); Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1032 days.

This patent is subject to a terminal disclaimer.

(21) Appl. No.: 11/496,272

(22) Filed: Jul. 31, 2006

(65) Prior Publication Data

US 2007/0026847 A1 Feb. 1, 2007

Related U.S. Application Data

(60) Provisional application No. 60/704,590, filed on Aug. 1, 2005.

(51) Int. Cl.
*H04M 3/42* (2006.01)
(52) U.S. Cl. .................................. 455/414.2; 455/414.3
(58) Field of Classification Search ............... 455/414.2, 455/414.3, 412.2
See application file for complete search history.

(56) References Cited

U.S. PATENT DOCUMENTS

| | | | | |
|---|---|---|---|---|
| 5,930,699 A | * | 7/1999 | Bhatia | 455/456.3 |
| 6,049,711 A | * | 4/2000 | Ben-Yehezkel et al. | 455/414.3 |
| 6,061,560 A | | 5/2000 | Saboorian et al. | |
| 6,285,317 B1 | | 9/2001 | Ong | |
| 6,321,158 B1 | | 11/2001 | DeLorme et al. | |
| 6,336,074 B1 | | 1/2002 | Woo | |
| 6,345,294 B1 | | 2/2002 | O'Toole et al. | |

(Continued)

FOREIGN PATENT DOCUMENTS

EP 1 343 287 9/2003

(Continued)

OTHER PUBLICATIONS

Polk, J., Schnizlein, J., and Linsner, M. "Dynamic Host Configuration Protocol Option for Coordinate-based Location Configuration Information" [online], Jul. 2004 [retrieved on Oct. 3, 2006]. Retrieved from the Internet <URL: http://tools.ietf.org/html/rfc3825>.

(Continued)

*Primary Examiner* — Patrick Edouard
*Assistant Examiner* — Shantell L Heiber

(57) ABSTRACT

A technique for displaying information ancillary to an entity's location. A request for information ancillary to the location of a communication unit in a communication network is generated by the communication unit wherein the request contains a location of the communication unit as well as specifies the information ancillary to the communication unit's location that is sought. The request is forwarded to an information server in the communication network which may be a "trusted source" meaning that the communication unit considers the information server a reliable (trustworthy) source of information. The information server receives the request and identifies the requested information using the location information contained in the request. A response (notification) containing the identified information is then generated by the information server and forwarded to the communication unit. The communication unit receives the notification and processes it accordingly, including displaying the identified information in a manner that indicates the requested information is available. If the requested information is not available, the communication unit provides a display indicating the information is not available.

18 Claims, 8 Drawing Sheets

U.S. PATENT DOCUMENTS

| | | | |
|---|---|---|---|
| 6,385,615 B1 | 5/2002 | Haeri et al. | |
| 6,459,782 B1 | 10/2002 | Bedrosian et al. | |
| 6,496,776 B1 | 12/2002 | Blumberg et al. | |
| 6,529,894 B1 | 3/2003 | Haeri et al. | |
| 6,545,596 B1 | 4/2003 | Moon | |
| 6,609,005 B1 | 8/2003 | Chern | |
| 6,665,611 B1 | 12/2003 | Oran et al. | |
| 6,680,998 B1 | 1/2004 | Bell et al. | |
| 6,704,406 B1 | 3/2004 | Pearce et al. | |
| 6,721,580 B1 | 4/2004 | Moon | |
| 6,744,858 B1 | 6/2004 | Ryan et al. | |
| 6,754,335 B1 | 6/2004 | Shaffer et al. | |
| 6,757,723 B1 | 6/2004 | O'Toole et al. | |
| 6,775,833 B1 | 8/2004 | Gits et al. | |
| 6,779,154 B1 | 8/2004 | Nussbaum et al. | |
| 6,806,814 B1 | 10/2004 | Iverson et al. | |
| 6,826,472 B1 | 11/2004 | Kamei et al. | |
| 6,874,084 B1 | 3/2005 | Dobner et al. | |
| 6,907,254 B1 | 6/2005 | Westfield | |
| 6,940,954 B1 | 9/2005 | Toebes | |
| 6,952,800 B1 | 10/2005 | Danner et al. | |
| 6,987,977 B2* | 1/2006 | Lockhart | 455/456.1 |
| 7,079,850 B2 | 7/2006 | Cameron | |
| 7,123,693 B2 | 10/2006 | Nelson et al. | |
| 7,602,886 B1* | 10/2009 | Beech et al. | 379/45 |
| 2001/0005809 A1 | 6/2001 | Ito | |
| 2001/0051852 A1 | 12/2001 | Sundaravel et al. | |
| 2002/0000999 A1 | 1/2002 | McCarty et al. | |
| 2002/0047787 A1 | 4/2002 | Mikkola et al. | |
| 2002/0056042 A1 | 5/2002 | van der Kaay et al. | |
| 2002/0133573 A1* | 9/2002 | Matsuda et al. | 709/220 |
| 2003/0036848 A1 | 2/2003 | Sheha et al. | |
| 2003/0055723 A1* | 3/2003 | English | 705/14 |
| 2003/0078035 A1 | 4/2003 | Sheha et al. | |
| 2003/0095520 A1 | 5/2003 | Aalbers et al. | |
| 2003/0140056 A1* | 7/2003 | Wall et al. | 707/102 |
| 2003/0218064 A1 | 11/2003 | Conner et al. | |
| 2004/0088346 A1 | 5/2004 | Hassler et al. | |
| 2004/0148091 A1 | 7/2004 | Masclet et al. | |
| 2004/0192339 A1 | 9/2004 | Wilson et al. | |
| 2004/0259545 A1 | 12/2004 | Morita | |
| 2005/0083911 A1* | 4/2005 | Grabelsky et al. | 370/352 |
| 2005/0111630 A1* | 5/2005 | Potorny et al. | 379/45 |
| 2005/0138144 A1 | 6/2005 | Sethi | |
| 2005/0153697 A1 | 7/2005 | Patel | |
| 2005/0195960 A1 | 9/2005 | Shaffer et al. | |
| 2005/0213716 A1 | 9/2005 | Zhu et al. | |
| 2005/0235056 A1 | 10/2005 | Chen et al. | |
| 2005/0253718 A1 | 11/2005 | Droms et al. | |
| 2006/0063539 A1 | 3/2006 | Beyer | |
| 2006/0193446 A1 | 8/2006 | Colunga | |
| 2007/0025337 A1 | 2/2007 | Polk | |
| 2007/0025339 A1 | 2/2007 | Polk | |
| 2007/0027997 A1 | 2/2007 | Polk | |
| 2007/0050128 A1 | 3/2007 | Lee et al. | |

FOREIGN PATENT DOCUMENTS

| | | |
|---|---|---|
| GB | 2278196 A | 11/1994 |
| JP | 2002 116033 A | 4/2002 |
| WO | WO 01/90920 A2 | 11/2001 |

OTHER PUBLICATIONS

Schulzrinne, H., "Dynamic Host Configuration Protocol (DHCPv4 and DHCPv6) Option for Civic Addresses Configuration Information" [online], Jan. 16, 2006 [retrieved on Oct. 3, 2006]. Retrieved from the Internet <URL:http//tools.ietf.org/html/draft-ietf-geopriv-dhcp-civil-09>.
Berners-Lee, T., "Universal Resource Identifiers in WWW", Request for Comments (RFC) 1630, IETF, Jun. 1994, pp. 1-28.
Droms, R., "Dynamic Host Configuration Protocol", RFC 2131, IETF, Mar. 1997, pp. 1-45.
O'Tuathail, E., et al., "Using the Simple Object Access Protocol (SOAP) in Blocks Extensible Exchange Protocol (BEEP)", RFC 3288, IETF, Jun. 2002, pp. 1-20.
Peterson, J., "A Presence-based GEOPRIV Location Object Format", IETF, draft-ietf-geopriv-pidf-lo-03, Sep. 9, 2004, pp. 1-24.
Polk, J., et al., "Session Initiation Protocol Location Conveyance", Internet Engineering Task Force (IETF), draft-ietf-sip-location-conveyance-01.txt, Jul. 17, 2005, pp. 1-73.
Roach, A. B., "Session Initiation Protocol (SIP)-Specific Event Notification", RFC 3265, IETF, Jun. 2002, pp. 1-38.
Rosenberg, J., et al., "SIP: Session Initiation Protocol", RFC 3261, IETF, Jun. 2002, pp. 1-269.
Shulzrinne, H., et al., "RTP: A Transport Protocol for Real-Time Applications", RFC 3550, IETF, Jul. 2003, pp. 1-104.
Office Action Mail Date May 11, 2009, U.S. Appl. No. 11/327,151.
Office Action Mail Date Mar. 17, 2009, U.S. Appl. No. 11/327,152.
Office Action Mail Date Feb. 25, 2009, U.S. Appl. No. 11/263,750.
Polk, James M., "Requirements for Session Initiation Protocol Location Conveyance," *IETF* (2003).
Office Action Mail Date Aug. 28, 2008, U.S. Appl. No. 11/263,750.
Office Action Mail Date Nov. 5, 2008, U.S. Appl. No. 11/327,151.
Office Action Mail Date Nov. 7, 2008, U.S. Appl. No. 11/327,152.
Office Action Mail Date Jul. 22, 2009, U.S. Appl. No. 11/327,151.
Office Action Mail Date Jul. 23, 2009, U.S. Appl. No. 11/327,152.
Office Action Mail Date Nov. 17, 2009, U.S. Appl. No. 11/263,750.
Final Office Action Mail Date Dec. 30, 2009, U.S. Appl. No. 11/327,152.
Final Office Action Mail Date Mar. 3, 2010, U.S. Appl. No. 11/327,151.
Office Action Mail Date Apr. 20, 2010, U.S. Appl. No. 11/327,152.
Final Office Action Mail Date Apr. 29, 2010, U.S. Appl. No. 11/263,750.
International Search Report dated Oct. 20, 2006 issued in related international application No. PCT/US2006/023855.
Interview Summary, Mail Date Apr. 7, 2011, U.S. Appl. No. 11/327,151.
Office Action, Mail Date Aug. 4, 2010, U.S. Appl. No. 11/327,151.
Office Action, Mail Date Jan. 3, 2011, U.S. Appl. No. 11/327,151.
Office Action dated Jun. 7, 2011 received in U.S. Appl. No. 11/327,151.
Office Action dated Jan. 1, 2011 received in U.S. Appl. No. 11/327,151.
Office Action dated Aug. 4, 2010 received in U.S. Appl. No. 11/327,151.
Interview Summary mailed Aug. 19, 2011 in co-pending U.S. Appl. No. 11/327,151.
Final Office Action mailed Nov. 9, 2011 in co-pending U.S. Appl. No. 11/327,151.

* cited by examiner

TECHNIQUE FOR DISPLAYING INFORMATION ANCILLARY TO A LOCATION OF AN ENTITY IN A COMMUNICATION NETWORK

RELATED APPLICATION

This application claims the benefit of U.S. Provisional Application No. 60/704,590, filed on Aug. 1, 2005. The entire teachings of the above application are incorporated herein by reference.

FIELD OF THE INVENTION

This invention relates to communication networks and in particular to displaying information ancillary to a location of an entity in a communication network.

BACKGROUND OF THE INVENTION

A communication network is a geographically distributed collection of nodes interconnected by communication links and segments for transporting communications (e.g., data) between communication units (end nodes), such as personal computers, certain telephones, personal digital assistants (PDAs), video units and the like. Many types of communication networks are available, with the types ranging from local area networks (LANs) to wide area networks (WANs). LANs typically connect nodes over dedicated private communications links located in the same general physical location, such as a building or campus. WANs, on the other hand, typically connect large numbers of geographically dispersed nodes over long-distance communications links, such as common carrier telephone lines. The Internet is an example of a WAN that connects networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

A communication network may comprise a series of intermediate nodes (e.g., routers) that are configured to carry communications through the network to the end nodes. Routers are often configured to "route" data, such as packets, between various nodes in the network. Routing is typically performed at layer-3 (L3), which is the network layer of the Open Systems Interconnection Reference Model (OSI-RM). Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains a L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

A router may execute one or more routing protocols that enable the router to route packets and exchange routing information with other routers in the network. The routers often use this information to configure (e.g., compute) their FDBs. The routing protocols may include distance-vector protocols, such as the Routing Information Protocol (RIP), or link-state protocols, such as the Intermediate-System-to-Intermediate-System (IS-IS) protocol and the Open Shortest Path First (OSPF) protocol.

Routing information is typically exchanged between the routers in the form of advertisement messages. For example, nodes executing the IS-IS protocol exchange routing information using an advertisement message called a Link State Packet (LSP). Likewise, nodes executing the OSPF protocol exchange routing information using an advertisement message called a Link State Advertisement (LSA). An intermediate node that acquires an advertisement message may use information contained therein to update its FDB.

Communication networks are increasingly being used to transport many forms of information including, e.g., voice and video information. Information may be carried on a communication network using various technologies, such as Voice over IP (VoIP). VoIP refers to a group of technologies that may be used to transmit e.g., voice information over communication networks from a source (calling party) to a destination (called party). Such networks may include a plurality of agents that convert e.g., voice and/or video information from its traditional form to a form that is suitable for packet transmission. In other words, the agent encodes, compresses and encapsulates the information into a plurality of data packets that are suitable for being carried by the communication network. Examples of agents include IP telephones, VoIP network interfaces, certain private branch exchanges (PBXs), personal computers (PCs) running communication applications, certain personal digital assistants (PDAs), network devices providing voice gateway services and so on.

In certain communication networks, such as VoIP networks and IP networks, a session protocol may be employed to establish a VoIP session (connection) that supports a call between a calling party and a called party. An example of a session protocol that is commonly used is the well-known Session Initiation Protocol (SIP) which is described in J. Rosenberg et al., "SIP: Session Initiation Protocol," Internet Engineering Task Force (IETF) Request For Comments (RFC) 3261. SIP operates at the application layer of the OSI-RM and is defined to establish and maintain sessions between endpoints (e.g., SIP-based telephones) in a communication network.

In accordance with SIP, endpoints are referred to as User Agents (UAs). When a UA comes on-line, it typically registers with a registration service, called a policy data point (PDP), using a SIP register command. The PDP maintains information about the UA which may include its location, how to reach it and authentication information associated with the UA that may be used to authenticate the UA. Typically, after a UA is registered, the UA is available to receive as well as initiate calls.

When a call is initiated by a calling party to a called party, a session is typically established between the calling and called parties' UAs to support the call. Establishing a session between the parties often involves (a) authenticating both parties and (b) successfully exchanging a sequence of messages between the parties in a predetermined manner. Authentication usually involves ensuring the parties have permission to establish a call in the network. The sequence of messages typically include an invite message issued by the calling party, an OK message issued by the called party followed by an acknowledgement (ACK) issued by the calling party. After the session is established, a channel may then be established, e.g., in accordance with the Real-time Transport Protocol (RTP) described in H. Schulzrinne et al., "RTP: A Transport Protocol for Real-Time Applications," IETF RFC 3550, to carry traffic (e.g., voice information) between the parties.

Some communication networks, such as IP based communication networks, enable a location associated with a communication unit to be determined. Here, triangulation or other methods may be used e.g., by a server to determine the communication unit's location. The communication unit may then learn its location from the server using a version of the Dynamic Host Configuration Protocol (DHCP) that is extended to provide the location information. An example of an extension to the DHCP protocol that may be used to provide location information is described in J. Polk et al., "Dynamic Host Configuration Protocol Option for Coordinate-based Location Configuration Information," IETF RFC 3825. In a typical arrangement, the communication unit requests its location information from the server using a DHCP request message and the server responds to the communication unit with a DHCP, response message that contains the communication unit's location.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
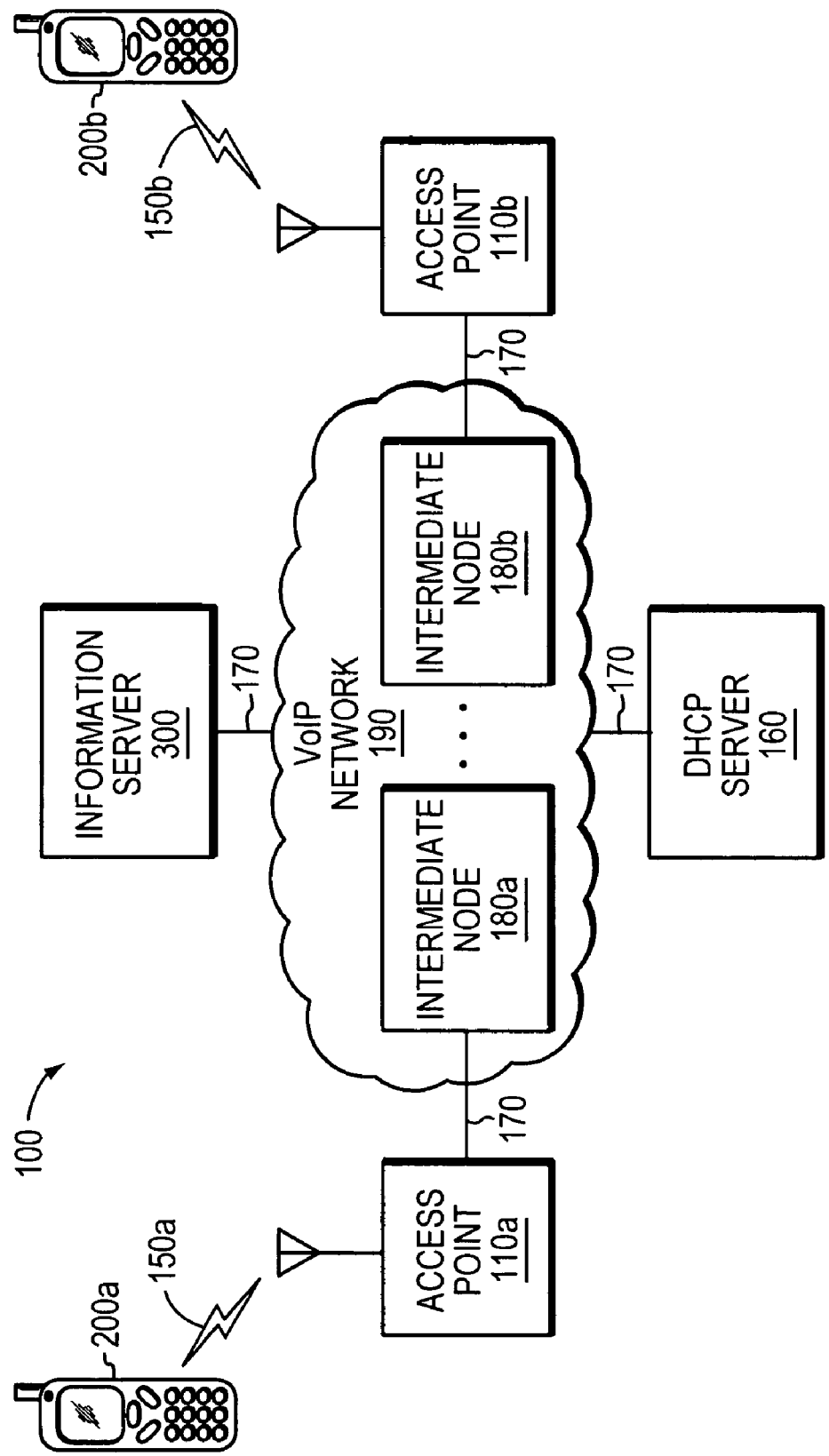
FIG. 1 is a block diagram of an exemplary communications network that may implement the present invention.

A description of preferred embodiments of the invention follows.

It should be noted, illustrated embodiments of the present invention, described herein, are described as using the Session Initiation Protocol (SIP) to establish and maintain sessions in a communication network as well as exchange information in the network. A version of the SIP protocol that may be used with the present invention is described in J. Rosenberg et al., "SIP: Session Initiation Protocol," RFC 3261, June 2002, available from the Internet Engineering Task Force (IETF) and is incorporated by reference in its entirely as though fully set forth herein. It should be noted that other protocols, such as the Simple Object Access Protocol (SOAP), Hypertext Transfer Protocol (HTTP), File Transfer Protocol (FTP) and Simple Mail Transfer Protocol (SMTP), may take advantage of aspects of the present invention.

One problem with some communication networks, especially IP-based communication networks, is that although an entity (e.g., a communication unit) may be able to determine its location using the network, it may not be able to determine certain information ancillary (relative) to its location. For example, Public Safety Access Points (PSAPs) are public agencies that are responsible for answering calls for emergency assistance from other public agencies, such as police, fire and ambulance services. In some IP networks, each PSAP is typically associated with a unique universal resource identifier (URI) which is used to establish communications with the PSAP via the IP networks. Current day IP networks do not provide URI information of PSAPs to a requesting entity relative to the requesting entity's location. Thus, it is possible for the entity to not have a URI for a PSAP that services the entity's current location. Further, since the entity does not have the PSAP URI information, the entity may not be able to provide an indication, e.g., to a user, as to whether the correct URI for a PSAP relative to the entity's location is "known" (available) to the entity.

The present invention overcomes shortcomings associated with the prior art by providing an indication at an entity (e.g., a communication unit) in a communication network whether information ancillary to an entity's location is known to the entity. Information that is ancillary to a location refers to information related to products and services associated with a location. For example, this information may include information related to a PSAP, police department, fire department or hospital that services the entity's location. Likewise, this information may include restaurants, stores and the like that are in the vicinity of the entity's location.

According to an aspect of the technique, a request for information is generated by a first entity (e.g., a communication unit) in a communication network wherein the request contains a location of the first entity. The request is forwarded to a second entity (e.g., an information server) in the communication network which is, illustratively, a "trusted source" meaning that the first entity considers the second entity a reliable (trustworthy) source of information. The second entity receives the request and identifies the requested information using the location information contained in the request. A response (notification) containing the identified information is then generated by the second entity and forwarded to the first entity. The first entity receives the notification and processes it accordingly, including displaying the identified information in a manner that indicates the requested information is known. If the requested information is not available, the first entity provides a display indicating the information is not known.

Advantageously, by providing an indication as to whether information ancillary to the location of the first entity is available or not available at the first entity, the present invention enables a user to readily discern that certain services, such as a PSAP, is accessible by the first entity. Further, advantageously, by ensuring the second entity is a trusted source, this information may be provided with a high degree of assurance that the information is correct.

FIG. 1 is a high-level block diagram of an exemplary communication network 100 that may implement the present invention. Communication network 100 comprises a collection of communication links 150, 170 interconnecting a plurality of nodes, such as communication units 200, access points 110, Dynamic Host Configuration Protocol (DHCP)

server 160, intermediate nodes 180 and information server 300, to form an internetwork of nodes. These internetworked nodes communicate by exchanging data packets according to a pre-defined set of network protocols, such as the Transmission Control Protocol/Internet Protocol (TCP/IP) and the Voice over IP (VoIP) protocol. A network protocol as used herein is a formal set of rules that define how data is exchanged between nodes in a communication network.

The intermediate nodes 180 are conventional intermediate nodes, such as routers, that are configured to implement a VoIP network 190. The access points 110 contain logic that enable the communication units 200 to transfer information (e.g., data) between the VoIP network 100 and communication units 200. To that end, the access points 110 comprise circuitry which is configured to transmit and receive signals (e.g., radio frequency (RF) signals) that carry the information between the access points 110 and the communication units 200 via wireless links 150. Examples of access points that may be used with the present invention include certain Institute of Electrical and Electronic Engineers (IEEE) 802.11 compliant access points as well as certain cellular telephone wireless systems that support the transfer of e.g., data traffic.

The access points 110 interface the communication units 200 with the network 100 and enable signals be transferred between the communication units 110 and the network 100. Specifically, the access points 110 convert signals received from the communication units 200 via wireless links 150 into data packets that are transferred onto the network 100 as well as convert packets received from the network into signals that are transferred to the communication units 200. Information (e.g., voice, video) is typically conveyed between the communication units 200 using calls which are established in network 100 between the communication units 200. It should be noted that the present invention may be adapted to work with fixed as well as mobile devices that are able to communicate via a communication network.

Figure 2:
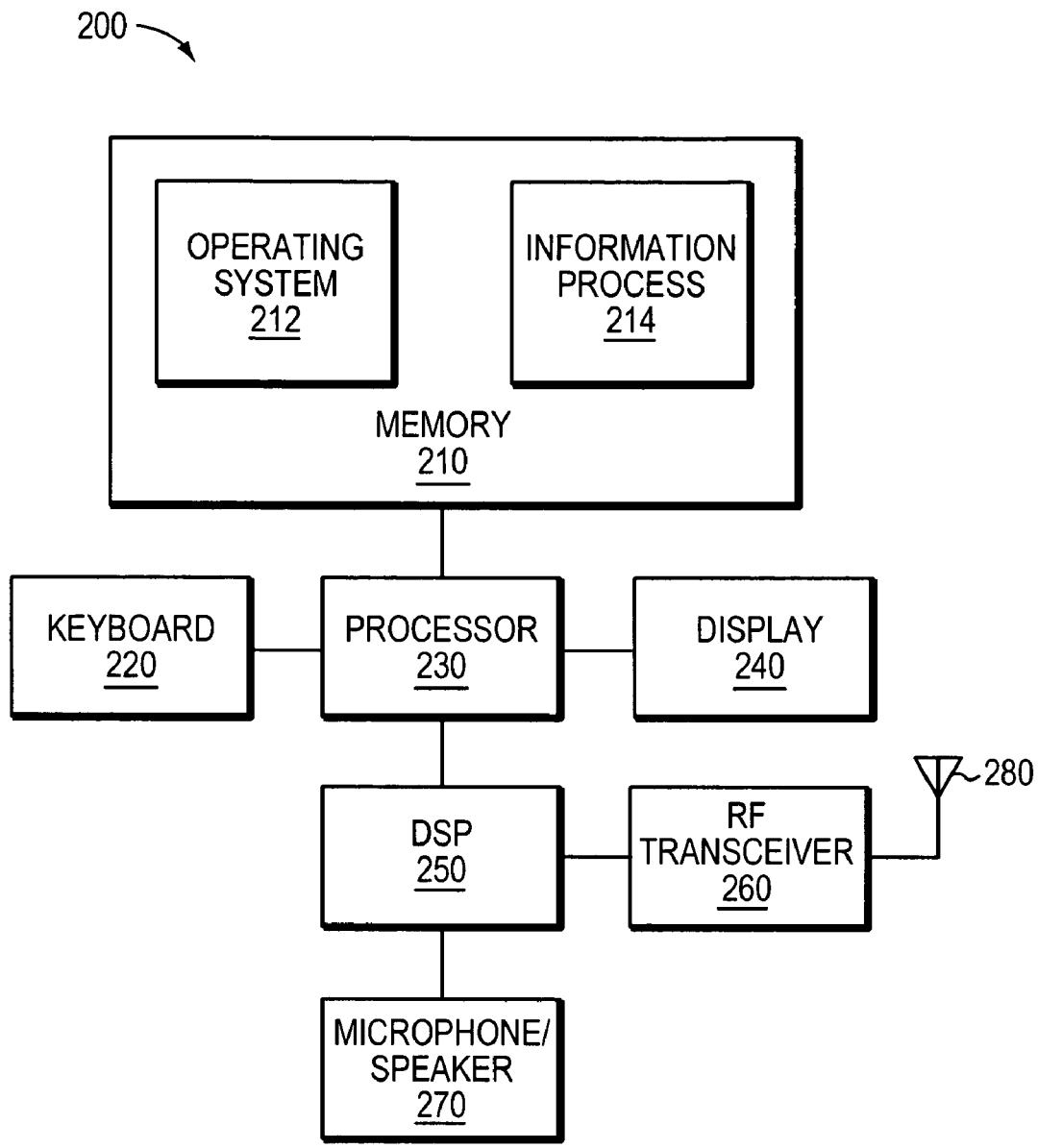
FIG. 2 is a block diagram of a communication unit that may be used with the present invention.

Communication units 200 are conventional communication units, such as wireless telephones, personal digital assistants (PDAs), IP telephones and the like, that enable, e.g., audible and/or visual communications to be converted into signals that are transferred to the access points 110 via wireless links 150. FIG. 2 is a high-level block diagram of an exemplary communication unit 200 that may be used with the present invention. Communication unit 200 comprises a memory 210, a keyboard 220, a CPU 230, a display unit 240, a digital signal processor (DSP) 250, an RF transceiver 260, a microphone/speaker 270 and an antenna 280. The keyboard 220 is a conventional keyboard device that enables information to be input into the communication unit by, e.g., a user. The processor 230 is a conventional central processing unit (CPU) configured to execute computer-executable instructions contained in memory 210 including instructions that implement aspects of the present invention. The display unit 240 is a conventional display unit that enables images (e.g, text, icons, pictures) to be displayed on the communication unit 200. The DSP 250 is a conventional digital signal processor that is capable of processing various analog and/or digital signals generated by e.g., the RF transceiver 260 and microphone/speaker 270 as well as providing various digital and/or analog signals to the microphone/speaker 270 and the RF transceiver 260. The RF transceiver 260 is a conventional RF transceiver that enables signals to be transferred between the network 100 and the communication unit 200 via antenna 280. The microphone/speaker 270 comprises circuitry that enables audio to be input into the communication unit 200 as well as output from the communication unit 200.

The memory 210 is a computer-readable medium implemented as a random access memory (RAM) comprising RAM devices, such as dynamic RAM (DRAM) devices and/or flash memory devices. Memory 210 contains various software and data structures used by processor 230 including software and data structures that implement aspects of the present invention. Specifically, memory 210 includes an operating system 212 and an information process 214. The operating system 212 functionally organizes the communication unit 200 by invoking operations in support of software processes and services executing on the communication unit, such as information process 214. Information process 214, as will be described further below, comprises computer-executable instructions to (a) generate requests for information relative to the communication unit's location, (b) forward the requests to the information server 300, (c) process responses (notifications) to the requests received from the information server 300 and (d) display information (e.g., text, icons, pictures) on the display 240 relative to information contained in the responses.

Information server 300 is a conventional server that (a) processes requests for information received from nodes in the network (e.g., communication units 200), (b) generates notifications containing the requested information and (c) forwards the notifications to the appropriate nodes. Illustratively, information server 300 is a "trusted source" meaning that nodes in the network consider the server 300 as a reliable (trustworthy) source of information.

Figure 3:
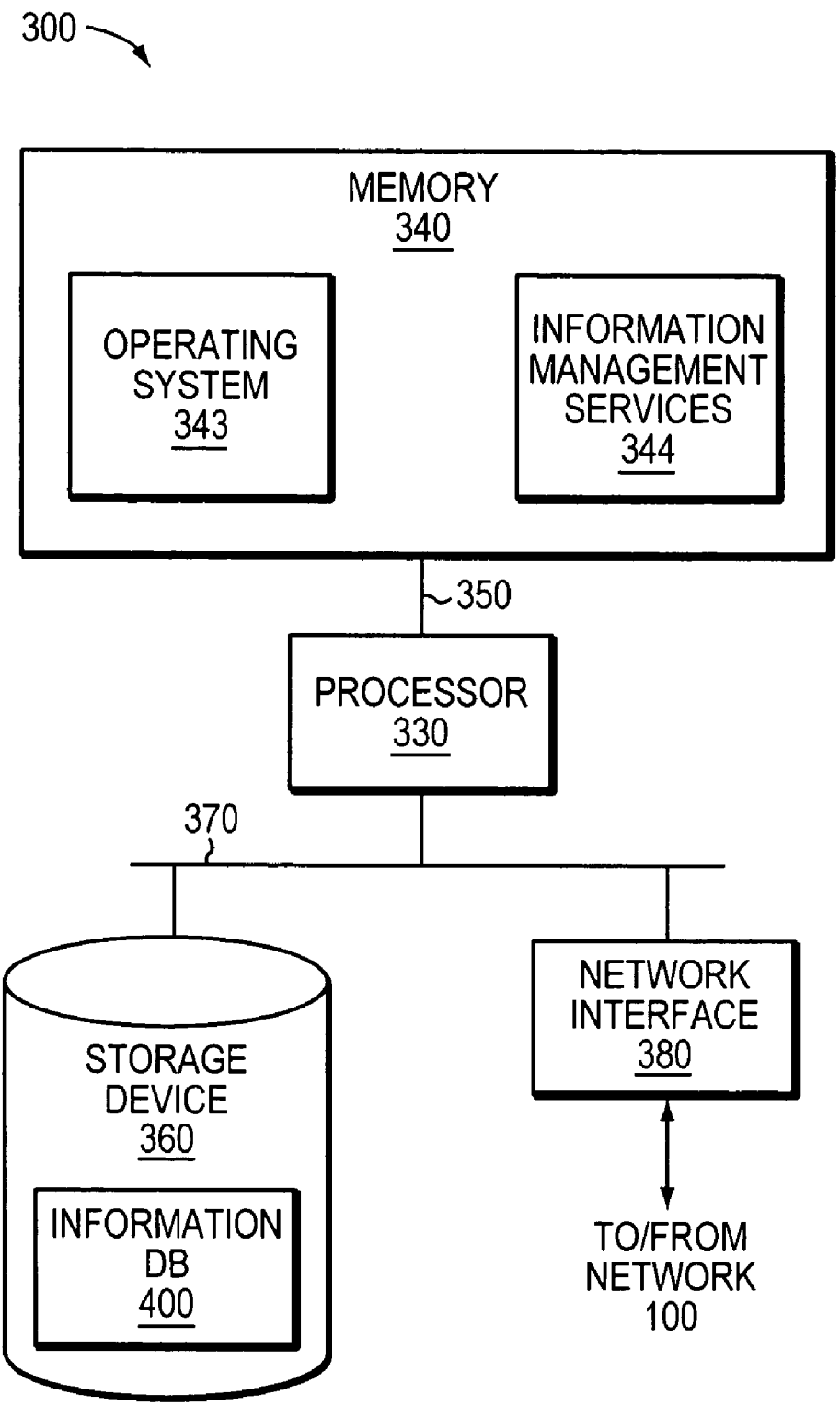
FIG. 3 is a block diagram of a server that may be used with the present invention.

FIG. 3 is a high-level block diagram of an exemplary information server 300 that may be used with the present invention. Server 300 comprises a memory 340 coupled to a processor 330 via a memory bus 350 and, a storage device 360 and a network interface 380 coupled to the processor 330 via an input/output (I/O) bus 370. It should be noted that server 300 may include other devices, such as keyboards, display units and the like. The network interface 380 interfaces the server 300 with the network 100 and enables data (e.g., packets) to be transferred between the server 300 and other nodes in the network 100. To that end, network interface 380 comprises conventional interface circuitry that incorporates signal, electrical and mechanical characteristics, and interchange circuits, needed to interface with the physical media of the network 100 and protocols running over that media. Storage device 360 is a conventional storage device (e.g., a disk) capable of storing information requested by the communication units 200. This information may include, for example, URI information associated with PSAPs.

The memory 340 is a computer-readable medium implemented as a RAM comprising RAM devices, such as DRAM devices and/or flash memory devices. Memory 340 contains various software and data structures used by the processor 330 including software and data structures that implement aspects of the present invention. Specifically, memory 340 includes an operating system 343 and information management services 344. The operating system 343 functionally organizes the translation server 300 by invoking operations in support of software processes and services executing on the server 300, such as information management services 344. Information management services 344, as will be described further below, comprises computer-executable instructions to process requests for information ancillary to the location of an entity in accordance with an aspect of the present invention.

Figure 4:
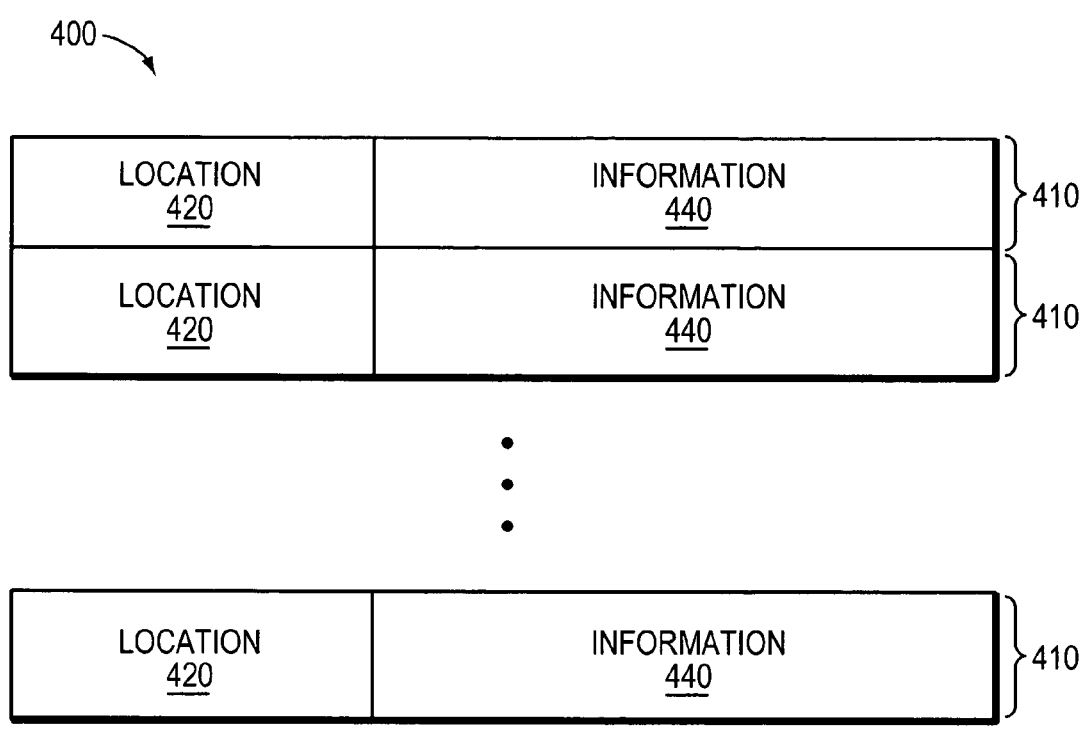
FIG. 4 illustrates an information database that may be used with the present invention.

Storage device 360 comprises information database (DB) 400 which is configured to hold various information requested, e.g., by the communication units 200. FIG. 4 illustrates an information DB 400 that may be used with the present invention. Information DB 400 is illustratively a table comprising one or more entries 410 wherein each entry contains a location field 420 and an information field 440. The location field 420 holds information that represents a location that may be, e.g., associated with a communication unit 200 and the information field 440 holds information that is associated with the location 420. This information illustratively includes a URI associated with a PSAP that services the location represented in the location field 420 as well as and text describing a metropolitan area serviced by the PSAP. It should be noted that the information field 440 may hold other information ancillary to a location specified in the location field 440, such as a list of stores, restaurants, other places of interest and so on.

It should be noted that functions performed by communication units 200 and the information server 300, including functions that implement aspects of the present invention, may be implemented in whole or in part using some combination of hardware and/or software. It should be further noted that computer-executable instructions and/or computer data that implement aspects of the present invention may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a communication network. Moreover, it should be further noted that some or all of the functions performed by, e.g., information server 300 and DHCP server 160 may be performed at a single node, such as an intermediate node 180, or spread across some combination of nodes. Here, the functions may be implemented as software entities (e.g., processes, tasks, threads) that execute on the various nodes.

In accordance with an aspect of the present invention, DHCP server 160 may be preconfigured with information about the location of entities (nodes) in network 100. An entity (e.g., a communication unit 200) may learn its location from the server 160 by (a) generating a DHCP message to request the information and (b) forwarding the generated request to the DHCP server 160. The server responds to the request with a DHCP message that contains the location information. It should be noted that entities in network 100 may use other means to determine their location, such as via a Global Positioning System (GPS) system accessible to the entities and the like.

Figure 5:
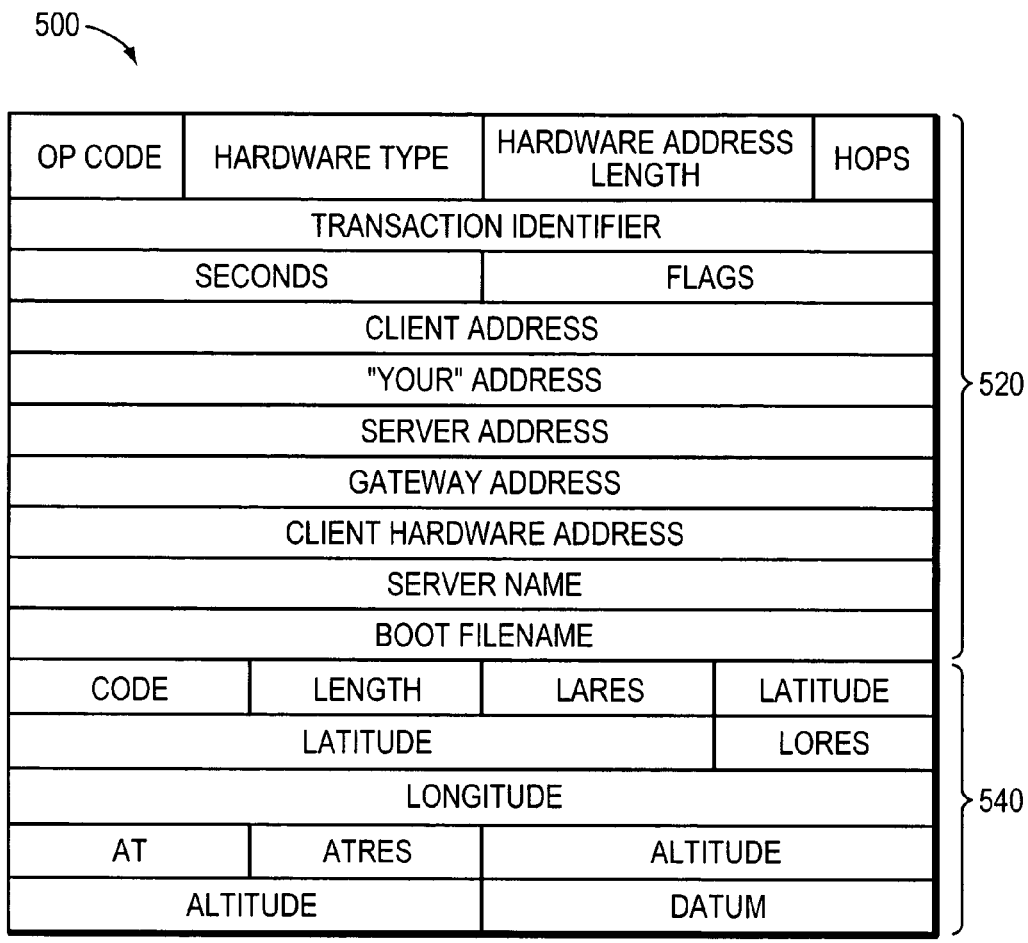
FIG. 5 illustrates a Dynamic Host Configuration Protocol (DHCP) message containing a DHCP option for coordinate location configuration information (LCI) that may be used with the present invention.

FIG. 5 is a block diagram of a DHCP message 500 that may be used with the present invention. Message 500 includes various DHCP information 520 and a DHCP coordinate location configuration information (LCI) option 540. The DHCP information 520 contains conventional DHCP message information, such as an operation (OP) code, client address, "your" address and so on.

The option 540 contains a code field, a length field, a latitude resolution (LARES) field, a latitude field, a longitude resolution (LORES) field, a longitude field, an altitude type (AT) field, an altitude resolution (ATRES) field, an altitude field and a datum field. The code field holds a value that identifies the option 540 as a coordinate LCI option. The length field holds a value that represents a length of the option 540, illustratively in bytes. The LARES field holds a value that represents a number of valid bits in a fixed-point value of the latitude contained in the latitude field. The latitude field holds a value that represents a latitude associated with an entity. The LORES field holds a value that represents a number of valid bits in a fixed-point value contained in the longitude field. The longitude field holds a value that represents a longitude associated with the entity. The AT field holds a value that represents an altitude type associated with the entity (e.g., meters, floors) altitude. The ATRES field holds a value that represents a precision associated with the value contained in the altitude field. The altitude field holds a value that represents an altitude of the entity. The datum field holds a value that represents information about the object 540, e.g., map datum was used for the coordinates given by this option 540.

A version of the DHCP protocol that may be used with the present invention is described in R. Droms, "Dynamic Host Configuration Protocol," RFC 2131, March 1997, and a DHCP option for coordinate LCI that may be used with the present invention is described in J. Polk et al. "Dynamic Host Configuration Protocol Option for Coordinate Based Location Configuration Information" RFC 3825, July 2004, both of which are available from the IETF and are hereby incorporated by reference in their entirety as though fully set forth herein. A document that describes how an end system may use DHCP to learn, e.g., a street address associated with the end system is described in H. Schulzrinne, "Dynamic Host Configuration Protocol (DHCPv4 and DHCPv6) Option for Civic Addresses Configuration Information", draft-ietf-geopriv-dhcp-civil-09.txt, which is available from the IETF and is hereby incorporated by reference as though fully set forth herein.

In accordance with an aspect of the present invention, information ancillary to the location of a communication unit 200 is acquired using a query/response type protocol. An example of a query/response protocol that may be used with the present invention is SIP. Specifically, the present invention utilizes a subscribe/notify technique to enable a communication unit 200 to acquire information ancillary to a communication unit's location from the information server 300. A subscribe/notify technique that may be used with the present invention is described in A. B. Roach, "Session Initiation Protocol (SIP)-Specific Event Notification," RFC 3265, which is available from the IETF and which is hereby incorporated by reference in its entirety as though fully set forth herein. It should be noted that other SIP techniques may be used with the present invention. For example, a technique that uses the SIP "options" and "200 OK" commands may be used with the present invention. It should be further noted that other query/response protocols may be used with the present invention, such as the well-known Hypertext Transfer Protocol (HTTP), Simple Mail Transfer Protocol (SMTP) and the like. A version of HTTP that may be used with the present invention is described in R. Fielding, "Hypertext Transfer Protocol—HTTP/1.1", RFC 2616 and a version of SMTP that may be used with the present invention is described in J. Klensin, "Simple Mail Transfer Protocol", RFC 2821, both of which are available from the IETF and both are hereby incorporated by reference as though fully set forth herein.

Figure 6:
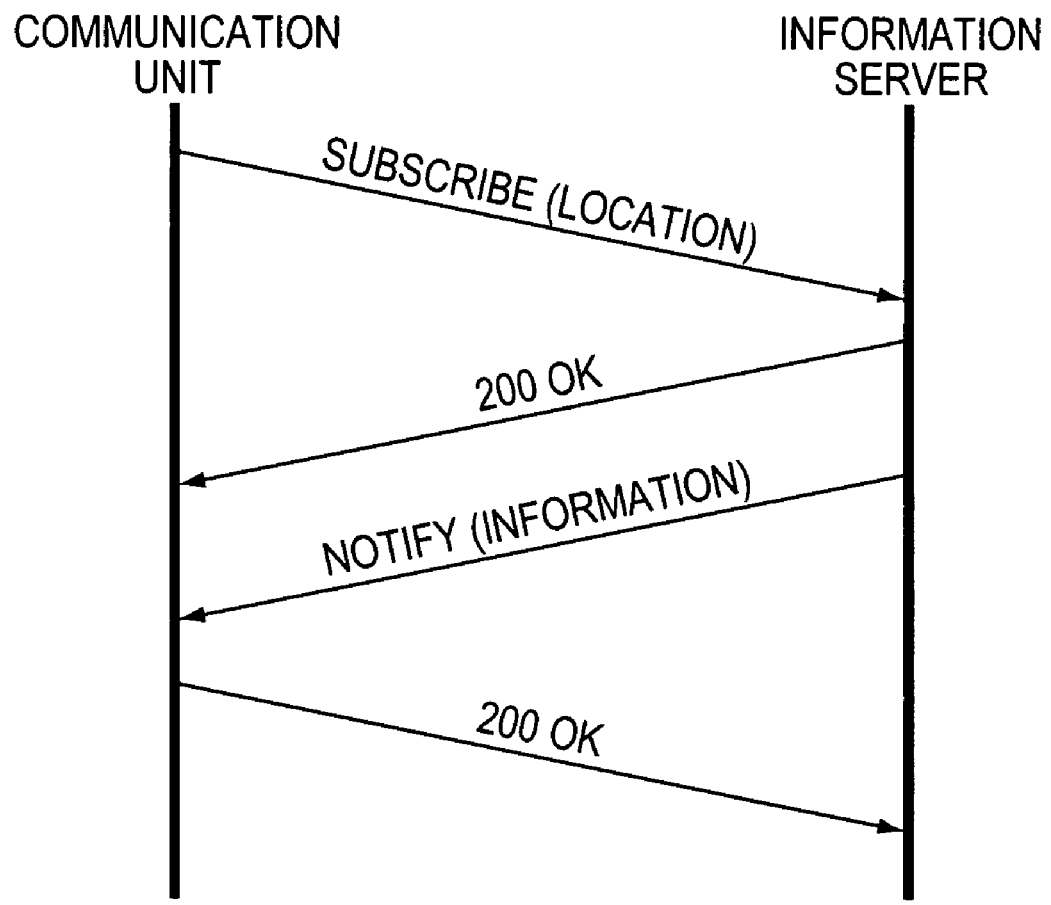
FIG. 6 illustrates an exchange of messages between a communication unit and an information server in accordance with an aspect of the present invention.

FIG. 6 illustrates a dialog between a communication unit 200 and the information server 300 using a subscribe/notify technique in accordance with an aspect of the present invention. The dialog begins when a communication unit 200 generates and issues a "subscribe" message to the information server 300. The subscribe message contains the location of the communication unit 200 and the type of information relative to its location that is being requested (e.g., the URI and text description of the PSAP that services the communication unit's location). The information server 300 acknowledges the subscribe message with a "200 OK" message. The information server 300 processes the subscribe message including (a) locating the requested information, (b) generating a "notify" message (notification) that contains the information and (c) transferring the notify message to the communication unit. The notify message is a response from the information server 300 to the communication unit 200 that contains the information that was requested by the subscribe message. The communication unit 200 receives the notify message and acknowledges it by responding to the information server with a "200 OK" message.

Figure 7:
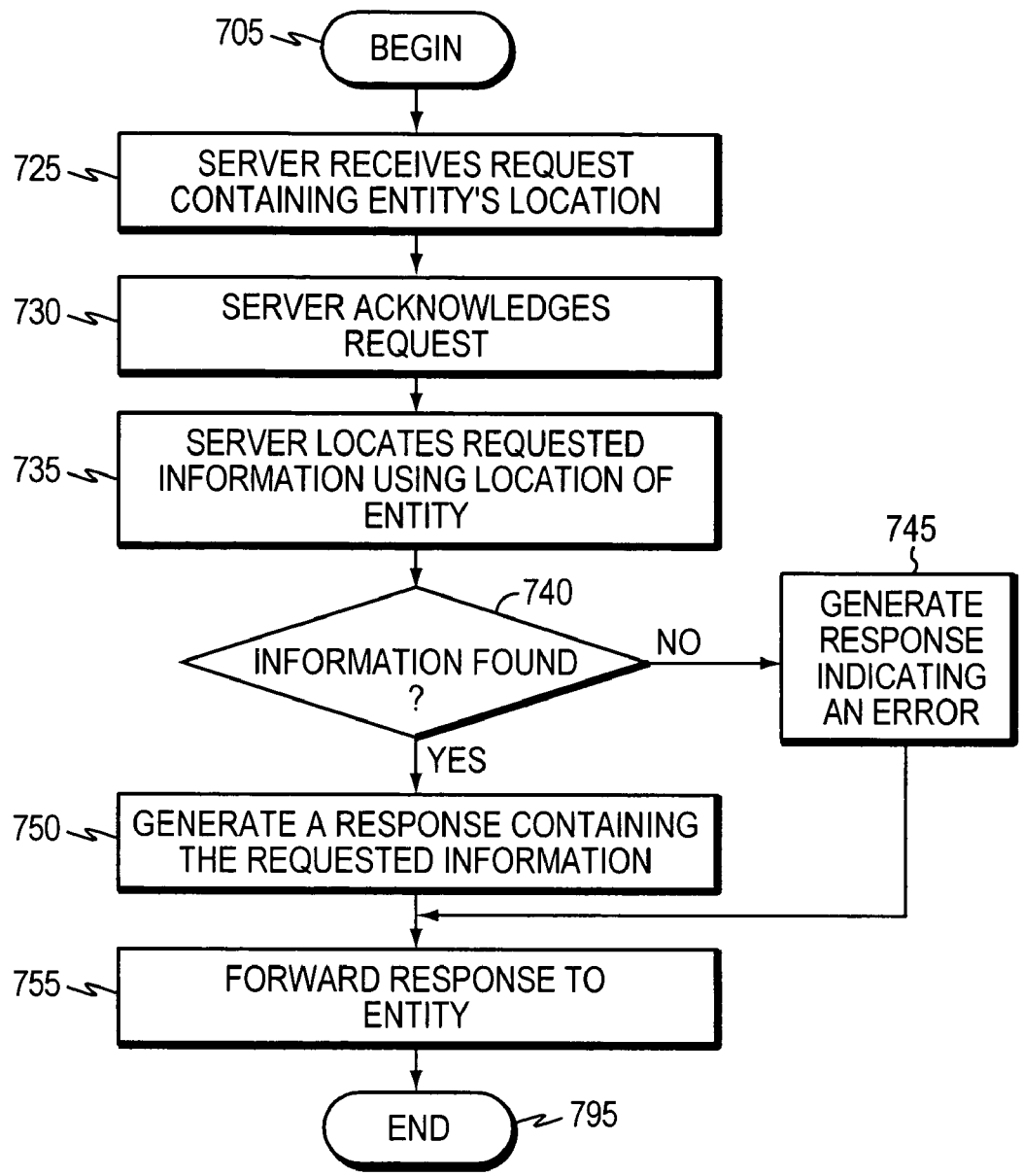
FIG. 7 is a flow chart of a sequence of steps that may be used to process a request for information ancillary to a location of an entity at a server in accordance with an aspect of the present invention.

FIG. 7 is a flow chart of a sequence of steps that may be used to process a request from an entity (e.g., communication unit 200) for information ancillary to a location of the entity at a server (e.g., information server 300) in accordance with an aspect of the present invention. The sequence begins at step 705 and proceeds to step 725 where the server receives the request (e.g., a SIP "subscribe" message) containing the location of the entity and identifying the information sought. Next, at step 730, the server acknowledges the request by sending an acknowledgement (e.g., a "200 OK" message) to the entity. At step 735, the server locates the requested information using the location of the entity specified in the request. The server then determines if the information was found (step 740). If not, the server generates a response indicating an error condition (step 745) and proceeds to step 755. Otherwise, the server generates a response containing the requested information (step 750). At step 755, the response is forwarded to the entity.

Figure 8:
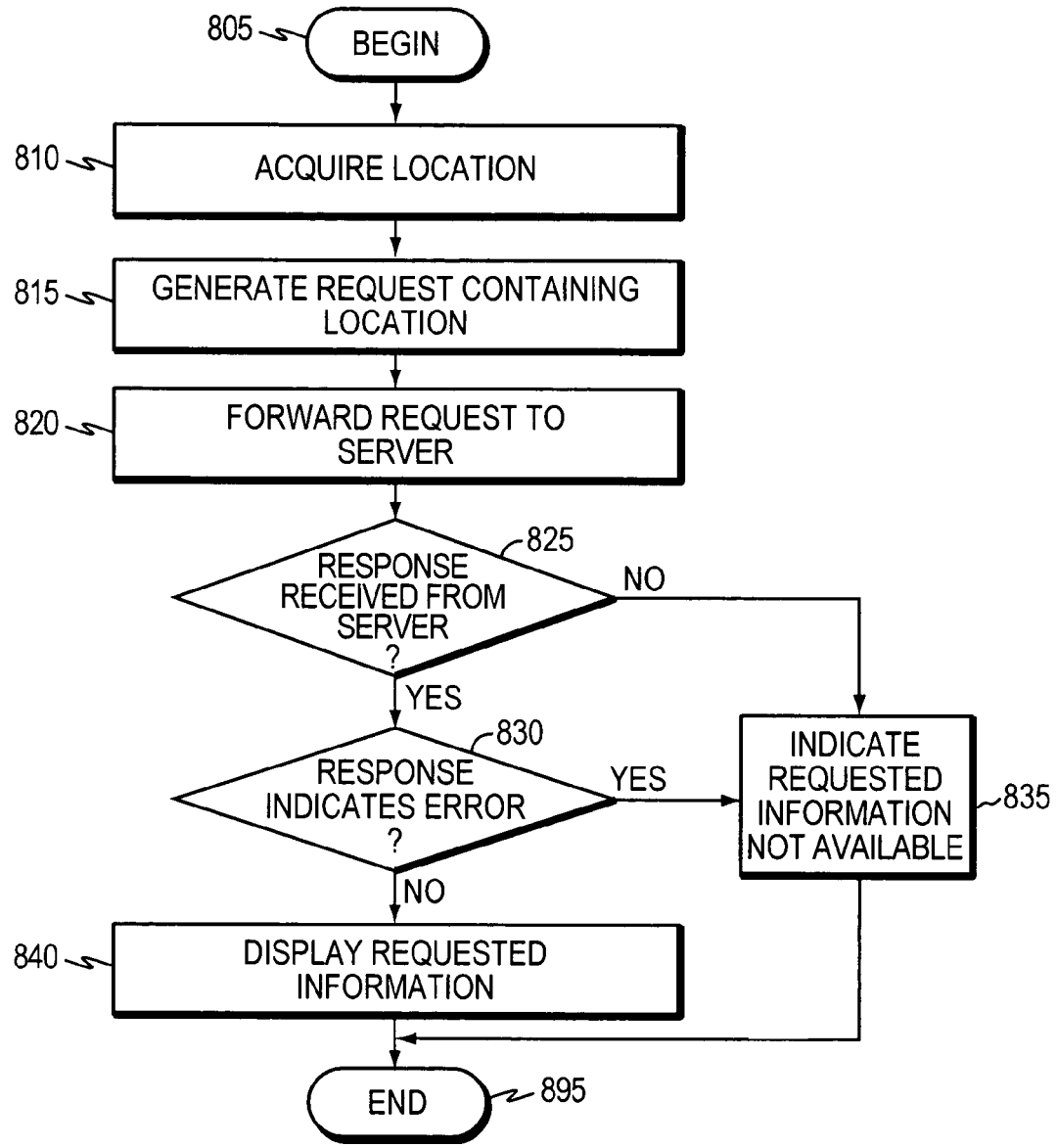
FIG. 8 is a flow chart of a sequence of steps that may be used to display information ancillary to a location of an entity in accordance with an aspect of the present invention.

FIG. 8 is a flow chart of a sequence of steps that may be used by an entity (e.g., communication unit 200) to acquire and display information ancillary to its location in accordance with an aspect of the present invention. The sequence begins at step 805 and proceeds to step 810 wherein the entity acquires its location. As noted above, the location may be acquired, e.g., using a DHCP server as well as other means, such as via a GPS accessible to the entity.

Next, at step 815, a request (e.g., a SIP subscribe message) is generated wherein the request contains the acquired location of the entity as well as identify the information sought. The request is then forwarded to the server (step 820). At step 825, a check is performed to determine if a response (e.g., a SIP notify message) containing the requested information was received by the server. If not, an indication that the requested information is not available is made (step 835) and the sequence proceeds to step 895. Otherwise, if a response was received from the server, the response is checked to determine if it indicates an error condition. If so, the sequence proceeds to step 835; otherwise, the sequence proceeds to step 840 where the information contained in the response is used to display the requested information. The sequence ends at step 895.

For example, referring to FIGS. 1, 7 and 8, assume that communication unit 200a wishes to provide an indication as to whether a URI associated with a PSAP that services the location of the communication unit 200a is known to the communication unit 200a. Communication unit 200a determines its location (step 810) by querying the DHCP server 160 for its location information. Specifically, communication unit 200 issues a DHCP message 500 to DHCP server 160 which responds with a DHCP message 500 having a coordinate LCI option 540 that contains the location information (e.g., latitude, longitude and altitude) of communication unit 200a. The communication unit 200a extracts its location information from the coordinate LCI option 540 contained in the DHCP message 500. Note that, as described above, communication unit 200a may determine its location using other means, such as using a GPS system and so on.

After it has determined its location, communication unit 200a generates a SIP subscribe message (request) that (a) contains its location and (b) specifies that the URI and metropolitan description of the PSAP associated with its location (step 815) is being requested. Communication unit 200a then forwards the request to the information server 300 (step 820). Specifically, the request is generated by the communication unit's processor 230 (FIG. 2) and forwarded via the RF transceiver 260 to the access point 110a via wireless link 150a. Access point 110a receives the request and forwards it to intermediate node 180a. The intermediate node 180a forwards the request onto network 190 to the information server 300.

Eventually the request is received by the information server 300 (FIG. 7 step 725) and is acknowledged (step 730), illustratively using a "200 OK" message. Specifically, the subscribe message is received by the information server's network interface 380 (FIG. 3) and forwarded to the information server's processor 330. The processor 330 generates the "200 OK" message and forwards it to the communication unit 200a via network interface 380. The "200 OK" message travels on network 190, is eventually received by intermediate node 180a and forwarded to access point 110a which transmits the "200 OK" message to the communication unit 150a. Communication unit 200a receives the "200 OK" message and processes it accordingly.

At step 735, the processor 330 queries database 400 using the location of communication unit 200a specified in the subscribe message to locate an entry 410 whose location value 420 matches the location specified in the subscribe message. Assume that a matching entry 410 is found (step 740) and that the information field 440 of the matching entry contains a value that represents a URI of the PSAP associated with the location represented in the matching location value 420 as well as information (e.g., text) indicating a metropolitan location (e.g., "Dallas, Tex.") associated with the PSAP. The processor 330 generates a notify message (response) and places the information 440 associated with the matching entry 410 in the generated notify message (step 750). The notify message is then forwarded to communication unit 200a (step 755).

Meanwhile, communication unit 200a determines if the notify message from the server has been received (step 825). Illustratively, the communication unit 200a repeatedly checks for some period of time to determine if the notify message has been received. If the notify message has not been received after some period of time has elapsed, the communication unit 200a concludes that the notify message has not been received from the server and indicates the requested information is not available (step 835). This indication may be in the form of a disabled icon (i.e., an icon that does nothing when selected) displayed on the display 240 that indicates the PSAP is not available. Alternatively, the communication unit 200a may display text or use a coloring scheme to indicate the PSAP URI is unknown on the display 240.

Assuming communication unit 200a has received the notify message, the communication unit 200a responds to the notify message by generating and forwarding a "200 OK" message (acknowledgement) to the server 300. Specifically, the notify message is received by the communication unit's RF transceiver 260 and transferred to the DSP 250. The DSP 250, in turn, forwards the notify message to the processor 230 which processes it. This processing includes generating a "200 OK" message in a conventional manner and forwarding it to the transceiver 260 which transmits the message onto the network 100 via the wireless link 150a. Access point 110a receives the message and forwards it onto the VoIP network 190 where it is eventually received by the server 300.

In processing the notify message further, the communication unit 200a determines if the notify message indicates an error (step 830). If so, the communication unit 200a indicates that the PSAP information is unavailable as described above. Assuming the notify message does not indicate an error condition, the communication unit 200a indicates that the PSAP URI is available and uses the metropolitan information contained in the notify message to display a metropolitan area associated with the PSAP URI. Illustratively, the PSAP is indicated as being available by displaying an icon representing a PSAP (e.g., an icon with the text "E911") that is enabled on the display unit. The metropolitan information is illustratively displayed as a name of the city associated with the PSAP. Alternatively, the communication unit 200a may display text or use a coloring scheme to indicate the PSAP URI is known.

It should be noted that the above-described techniques may be adapted to provide information other than PSAP information at a communication unit. For example, the above-described technique may be adapted to acquire URIs and display an appropriate indication of businesses (e.g., restaurants, stores, etc.) within a certain locale of the entity. This may include displaying an icon or the like which indicates that the URIs for certain businesses are known to the communication unit.

It should be noted that the above-described techniques may be adapted to work in networks other than VoIP networks. For example, the above-described techniques may be adapted to work in cellular telephone networks. Here, a display may be used to indicate, e.g., whether a particular mobile telephone in the cellular network can or cannot reach a PSAP within a particular area (e.g., metro area).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of displaying public safety information related to a location of a first entity in a communication network, the method comprising:
   acquiring, by the first entity, the location of the first entity from an external server;
   generating a first request for a Uniform Resource Identifier (URI) and description associated with a public safety access point (PSAP) that services the location of the first entity, wherein the first request includes the location of the first;
   forwarding the first request to a second entity;
   receiving a notification from the second entity containing the requested URI and description associated with the PSAP that services the location of the first entity;
   generating a display based on the received URI and description associated with the PSAP that services the location of the first entity; and
   displaying the generated display at the first entity.

2. A method as defined in claim 1 wherein the second entity is a trusted source.

3. A method as defined in claim 1 further comprising:
   generating a second request for the location of the first entity;
   forwarding the second request to the external server; and
   receiving a response containing the first entity's location.

4. A method as defined in claim 3 wherein the second request is a Dynamic Host Control Protocol (DHCP) message.

5. A method as defined in claim 4 wherein the message contains a coordinate location information (LCI) option for holding information associated with the first entity.

6. A method as defined in claim 1 wherein the first request message is a Session Initiation Protocol subscribe message.

7. A method as defined in claim 1 further comprising:
   waiting for the notification for up to a period of time; and
   if the notification is not received within the period of time, displaying an indication that the requested information is not available.

8. A method as defined in claim 1 further comprising:
   determining if the notification indicates the information is not available; and
   if the notification indicates the information is not available, displaying an indication that the requested information is not available.

9. A method as defined in claim 8 wherein the indication is displayed as a disabled icon.

10. A method as defined in claim 8 wherein the indication is displayed using a coloring scheme that indicates the information is not available.

11. A communication unit comprising:
    a processor configured to:
       acquire the location of the first entity from an external server;
       generate a first request for a Uniform Resource Identifier (URI) and description associated with a public safety access point (PSAP) that services the location of the first entity, wherein the request includes the location of the first entity,
       forward the first request to a second entity,
       receive a notification from the second entity containing the requested URI and description associated with the PSAP that services the location of the first entity,
       generate a display based on the received URI and description associated with the PSAP that services the location of the first entity; and
    a display unit configured to:
       display the generated display at the first entity.

12. A communication unit as defined in claim 11 wherein the processor is further configured to:
    generate a second request for the location of the first entity,
    forward the second request to the external server, and
    receive a response containing the first entity's location.

13. A communication unit as defined in claim 11 wherein the processor is further configured to wait for the notification for up to a period of time and the display unit is further configured to display an indication on the display that the requested information is not available if the notification is not received within the period of time.

14. A communication unit as defined in claim 11 wherein the processor is further configured to determine if the notification indicates the information is not available and the display unit is further configured to display an indication that the requested information is not available if the notification indicates the information is not available.

15. An apparatus comprising:
    means for acquiring the location of a first entity from an external server;
    means for generating a first request for a Uniform Resource Identifier (URI) and description associated with a public safety access point (PSAP) that services the location of the first entity, wherein the request includes the location of the first entity;

means for forwarding the first request to a second entity via a communication network;

means for receiving from the second entity via the communication network a notification containing the requested URI and description associated with the PSAP that services the location of the first entity;

means for generating a display based on the received URI and description associated with the PSAP that services the location of the first entity; and means for displaying the generated display at the first entity.

16. An apparatus as defined in claim 15 further comprising:

means for generating a second request for the location of the first entity;

means for forwarding the second request to the external server; and means for receiving a response containing the first entity's location.

17. An apparatus as defined in claim 15 further comprising:

means for waiting for the notification for up to a period of time; and means for displaying an indication that the requested information is not available, if the notification is not received within the period of time.

18. An apparatus as defined in claim 15 further comprising:

means for determining if the notification indicates the information is not available; and means for displaying an indication that the requested information is not available, if the notification indicates the information is not available.

* * * * *